United States Patent [19]
Brooks et al.

[11] Patent Number: 5,442,548
[45] Date of Patent: Aug. 15, 1995

[54] MODULAR DISTORTION CORRECTING REAL TIME SSM/I IMAGERY DECOMMUTATOR AND PROCESS FOR PRODUCING SPECIAL SENSOR APPLIED METEOROLOGICAL IMAGES

[75] Inventors: Bruce Brooks, Omaha, Nebr.; Jimmy A. Jensen, Shenandoah, Iowa; Edwin A. Krzycki, Omaha, Nebr.; Ross Mapson, Omaha, Nebr.; Dale L. Nye, Omaha, Nebr.; David L. Stone, Omaha, Nebr.; Troy R. Luster, Bellevue, Nebr.

[73] Assignee: Harris Corporation, Melbourne, Fla.

[21] Appl. No.: 820,501

[22] Filed: Jan. 14, 1992

[51] Int. Cl.6 .......................... G01V 1/00; H04N 7/18
[52] U.S. Cl. ..................................... 364/420; 348/147
[58] Field of Search ................ 364/420; 358/109, 125, 358/110, 160; 356/5; 395/200

[56] References Cited
U.S. PATENT DOCUMENTS

| | | | |
|---|---|---|---|
| 3,560,642 | 2/1971 | Schroader | 358/109 |
| 4,682,300 | 7/1987 | Seto et al. | 358/109 |
| 4,746,976 | 5/1988 | Kamel et al. | 358/103 |
| 5,225,842 | 7/1993 | Brown et al. | 342/357 |

Primary Examiner—Gail O. Hayes
Assistant Examiner—Khai Tran
Attorney, Agent, or Firm—Evenson, McKeown, Edwards & Lenahan

[57] ABSTRACT

A modular distortion correcting real-time SSM/I imagery decommutator applies earth curvature corrections to operational line scan (OLS) and special sensor meteorological image (SSM/I) data which is generated by OLS and SSM/I sensors on board a Defense Meteorological Satellite Program (DMSP) satellite scanning the earth's surface. The OLS image data is resampled to remove a number of image pixels near the center of a scan line and to interpolate additional pixels toward the edge of the scan line. The SSM/I data is resampled to remove long track and cross track distortions caused by the SSM/I sensor scan angle. The resampled SSM/I data is then adjusted to compensate for the scan position of the SSM/I sensor. The OLS data image from the OLS sensor and at least one environmental data record (EDR) image obtained from the SSM/I sensor, for a particular geolocation, are displayed by embedding at least one EDR image into the OLS data image to produce a single combined image which can then be displayed.

28 Claims, 12 Drawing Sheets

Notes:
1. r = radius of the earth
2. $\alpha = \text{Arctan}\left[\frac{X}{Z}\right]$ (see FIG. 6)
3. $L1 = r\cos(\alpha)$
4. $A1 = \xi L1$
5. $A1 \neq A2$
6. v is the velocity vector

MODULAR DISTORTION CORRECTING REAL TIME SSM/I IMAGERY DECOMMUTATOR AND PROCESS FOR PRODUCING SPECIAL SENSOR APPLIED METEOROLOGICAL IMAGES

This invention was made with government support under a proprietary government contract (Contract No. F04701-86-C-0155). The government has certain rights in this invention.

This application is related to application Ser. No. 07/820,490, entitled "Universal Downloadable Decommutator" filed on an even date herewith and assigned to the Assignee of the present invention, the Specification of which is herein expressly incorporated by reference.

FIELD OF THE INVENTION

The present invention relates to a meteorological image production process and, more particularly, to distortion correcting processes and image formatting processes for satellite sensor information. The distortion correcting processes are operable in real-time to remove distortion caused by the curvature of the earth, antenna construction and orientation and receiver gain fluctuation. The image formatting processes are operable to embed two or more distinct images into a single visual display.

BACKGROUND OF THE INVENTION

The Defense Meteorological Satellite Program (DMSP) includes a block 5D-2 satellite having a special sensor microwave imager (SSM/I) which is used passively to measure microwave radiation in the 19–85 GHz range of the electromagnetic spectrum. The satellite then downlinks the digital data acquired for processing. Via the data processing of the output of the satellite, the radiation can be used to create colored images that contain accurately measured amounts of several meteorological parameters such as: surface wind speed, precipitation, water vapor, soil moisture, surface type, etc. These meteorological parameters are known as environmental data records (EDRs). The environmental data records are studied in conjunction with operational line scan (OLS) images generated from the satellite for applications such as weather forecasting.

In attempting to use both the SSM/I and OLS image types together, a number of difficulties arise. Specifically, each of the two image types are generally presented as distinct images. Current practice therefore requires a user to attempt to correlate the information visually by observing several separate images. Further, the user must filter out non-significant data and "invalid" data. For example, surface wind speed data is invalid over areas where there is significant rainfall. Therefore, it becomes very difficult for the user, e.g., a meteorologist or weather forecaster, to correlate the separate images for a specific geographical location scanned by the satellite.

Another difficulty in attempting to use both the SSM/I and OLS images together arises in that the resolution of the SSM/I and OLS sensors are significantly different. For example, the OLS smooth data has a resolution of 1.5 nautical miles and the SSM/I sensor has a resolution of 6.75 nautical miles from its sensor. Still further, the SSM/I sensor has seven distinct channels including four separate microwave frequencies that are used, for example 19, 22, 37 and 85 GHz. Three of the four microwave frequencies, i.e. 19, 37 and 85 GHz have both vertical and horizontal polarization and only one, i.e. 22 GHz, has just vertical polarization. Thus, the resolution of the channels within the SSM/I sensor also differ from the OLS sensor resolution.

Further, attempting to use the two image types together presents geolocation problems arising via the configuration of the sensors on the satellite. The OLS sensor is arranged on the satellite to point directly toward the center of the earth, i.e. it looks straight down on the curved surface of the earth. In contrast, the SSM/I sensor does not point toward the center of the earth, but rather is directed out of the end of the satellite at a 45° angle to the vertical. Therefore, at any one point in time, the two images being recorded from the two sensors are for different locations on the earth's surface. For the OLS sensor, the curvature of the earth in the cross track direction, i.e., a line orthogonal to the satellite track (path), is significant and must be corrected. However, no earth curvature correction is required in the long track direction, i.e., the path the satellite follows over the earth at the subpoint (subpoint is the point on the earth's surface through which a line passes if drawn from the center of the satellite to the center of the earth), for the OLS sensor. For the SSM/I sensor, both long track and cross track corrections must be made to account for the curvature of the earth and SSM/I antenna orientation.

There is therefore needed a process and apparatus for solving the above-described problems and providing a single viewable image displaying both SSM/I and OLS images.

SUMMARY OF THE INVENTION

The present invention solves the above problems through the use of specialized decommutation equipment, orbital mechanics and embedded image calibrating and correcting software.

The present invention operates by receiving the "raw" DMSP data stream, decommutating out the SSM/I data from the DMSP data stream, and then applying earth curvature and antenna pattern corrections, temperature conversion and calibration and data formatting to the SSM/I data. This processing of the SSM/I data results in an image that is of the same resolution as the OLS images and therefore may be manipulated and combined with the OLS visual or infrared imagery to produce a single display. A special sensor applied meteorological image production process (SSAMI) constructs the combined image using one or more EDRs that are converted into an image format that is embedded directly into the OLS image.

It is an advantage of the present invention to provide the user with the images much faster than was previously possible. The unique combination of hardware and software allows the distortion correcting of the images to be accomplished in real-time.

It is a further advantage of the present invention to provide a modular distortion correcting real-time SSM/I imagery decommutator to provide modularity which allows a great amount of flexibility, maintainability and performance. Because of its modular design, additional functions may be incorporated into the system easily and quickly by connecting additional circuit card assemblies.

Yet another advantage of the present invention accounts for the various sensor resolutions by reducing all the images to the same resolution and then embedding the significant characteristics of an image into another image so as to eliminate the geolocation problems. Because non-significant and invalid data is replaced, the user no longer has to visually filter out any data.

Other objects, advantages and novel features of the present invention will become apparent from the following detailed description of the invention when considered in conjunction with the accompanying drawings.

DETAILED DESCRIPTION OF THE DRAWINGS

Figure 1:
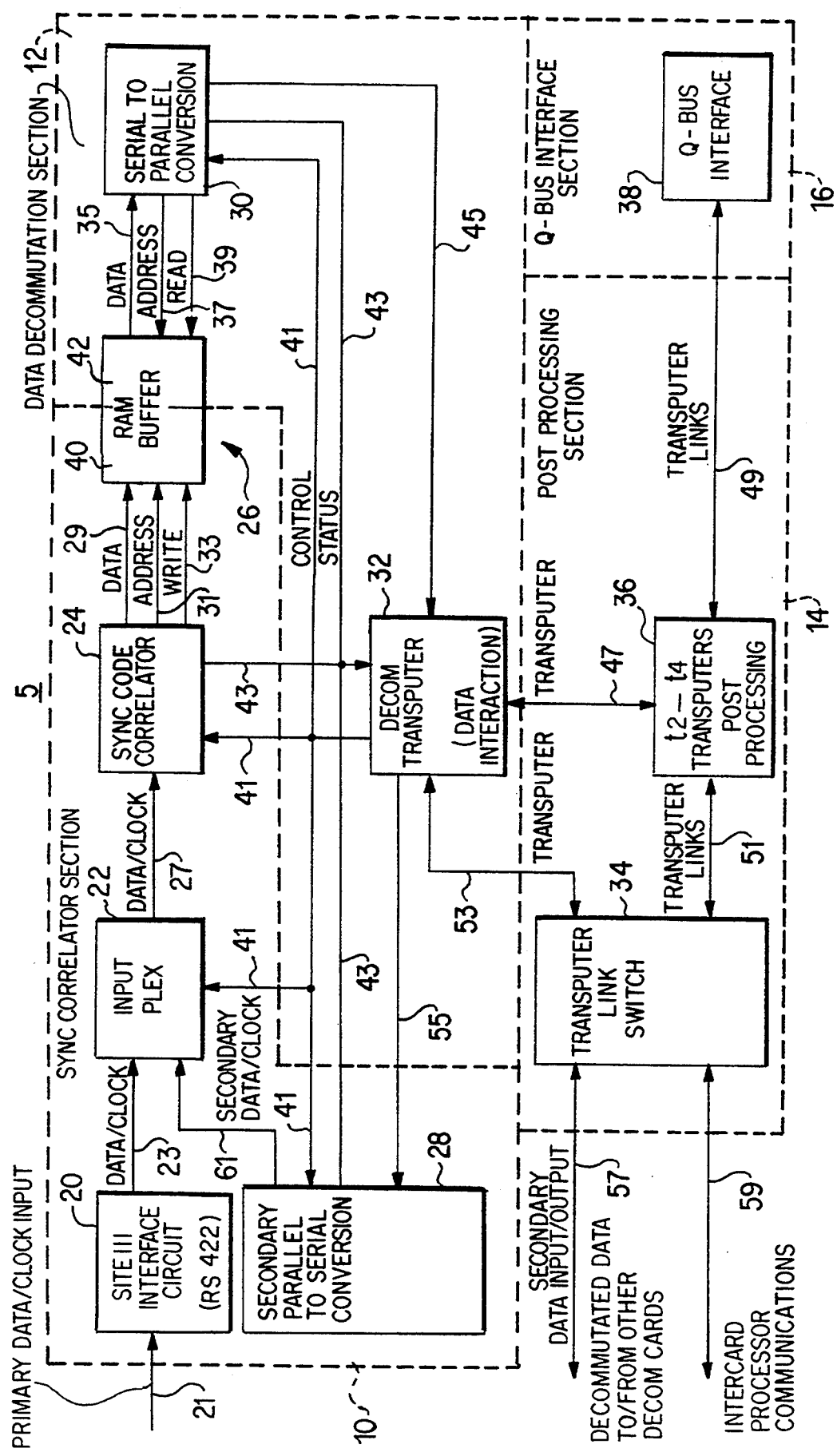
FIG. 1 is a schematic block diagram of the decommutator circuit card according to the present invention.

Referring to FIG. 1, there is shown a functional block diagram of one circuit card assembly 5 for a modular distortion correcting real-time SSM/I decommutator architecture according to the present invention. Each circuit card assembly 5 includes a number of components, integrated circuits and a circuit board. A number of these circuit card assemblies 5 can be mounted into a backplane of a multi-purpose host computer (not shown). The circuit card assemblies 5 make extensive use of field programmable gate arrays and microprocessors such as INMOS T425 and T805 "transputers". Because of the flexibility of the transputers, the circuit card assembly 5 can be programmed to perform many different functions. Because each circuit card assembly 5 is identical, maintenance problems are substantially reduced.

Figure 2:
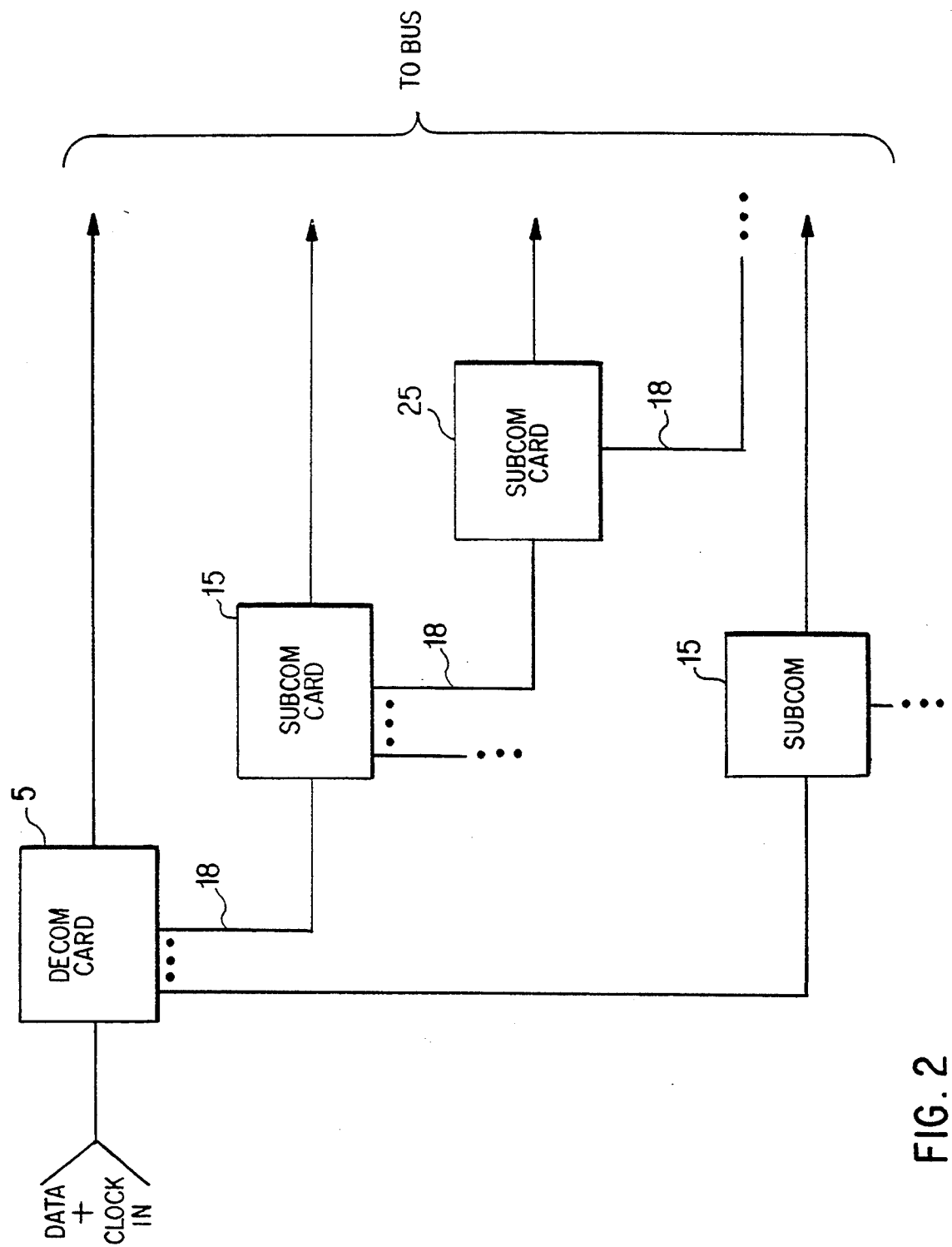
FIG. 2 is a schematic block diagram illustrating the cascadability of the circuit card of FIG. 1.

Each circuit card assembly 5 contains a transputer link switch 34 and an external port 57, 59 such that the board 5 can be connected one to another in a modular fashion. FIG. 2 illustrates one example of how the circuit card assembly 5 can be cascaded to a second level of circuit cards 15 and further to a third level 25.

The data input and output boundaries for each circuit card are such that each card 5 performs one complete level of data synchronization, data separation and data processing before the data is routed to a second circuit card assembly or to the host processor (not shown). As noted in FIG. 2, if a second data type is to be processed that requires additional levels of synchronization, another circuit card assembly is simply connected to the initial circuit card. Further, additional circuit cards may be added to the configuration without modifying any existing cards. The only limitation on the number of circuit cards, i.e., levels of decommutation, that may be cascaded together is dependent upon the host processor's capacity to support the cards.

A more detailed description of the decommutator circuit card assembly architecture and its operation is provided in co-pending application Ser. No. 07/820,490, entitled "Universal Downloadable Decommutator" filed on an even date herewith and assigned to the Assignee of the present invention, the Specification of which is herein expressly incorporated by reference.

Referring back to FIG. 1, the circuit card assembly 5 for the modular distortion correcting real-time SSM/I imagery decommutator includes a synchronization correlator section 10, data decommutation section 12, post processing section 14 and a bus interface section 16.

The synchronization correlator section 10 includes an interface circuit 20 such as a standard RS 422 compatible interface which can interface, for example, with the Air Force Global Weather Central Site III. The interface circuit 20 receives the primary data/clock input stream 21. The interface circuit 20 couples the primary data/clock input stream 23 to an input multiplexer 22. A synchronization code correlator 24 receives the data/clock input 27 from the input multiplexer 22. The synchronization code correlator 24 provides a data output 29, address 31 and write signal 33 to a random access memory (RAM) data storage buffer 26. The synchronization code correlator section 10 further includes a secondary parallel-to-serial conversion circuit 28 which provides a secondary data/clock input 61 to the input multiplexer 22.

The data decommutation section 12 includes the RAM data storage buffer 26 which is shared with the synchronization correlator section 10, and a serial-to-parallel data conversion circuit 30 which receives the data input 35 from the RAM data storage buffer 26 and provides an address 37 and read signal 39 to the RAM data storage buffer 26. Further, the data decommutation section 12 includes a general purpose microcomputer 32 containing hardware for parallel processing and synchronized interprocessor communications. For example, an INMOS TM IMS T425 "transputer" which is a 32-bit CMOS microcomputer, may be used The microcomputer 32, hereinafter referred to as a transputer, receives data input 45 from the serial-to-parallel conversion circuit 30 and can provide data output 47 to the post processing transputer and data output 53 to the transputer link switch 34. At a secondary level of decommutation, the transputer 32 receives internal data 57 on data input 53 from transputer link switch 34 and can provide data output 55 to the secondary parallel-to-serial converter 28. The transputer 32 provides control information 41 to the synchronization code correlator 24, input multiplexer 22, secondary parallel-to-serial conversion circuit 28 and the serial-to-parallel conversion circuit 30. The transputer 32 further receives status information 43 from the synchronization code correlator 24, serial-to-parallel conversion circuit 30 and the secondary parallel-to-serial conversion circuit 28.

The post processor section 14 is coupled via transputer links 53 and 47 to the transputer 32 in the data decommutation section 12. The post processor section 14 includes a transputer link switch 34 coupling, via transputer links 53, to the transputer and several post processing transputers 36 (labeled in FIG. 1 as transputers t2–t4). The post processing transputers 36 are coupled via transputer links 47 to the transputer 32 in the data decommutation section 12. The post processing transputers 36 are also coupled to the transputer link switch 34 via transputer links 51. The transputer link switch 34 includes a secondary data input/output bus 57 and an intercard processor communication bus 59.

The bus interface section 16 includes a bus interface circuit 38 which is coupled via transputer links 49 to the post processing transputers 36 in the post processor section 14. The bus interface circuit 38 couples with a host computer (not shown), currently a Digital Equipment Corporation VAX processor using a Q-bus, but others can be supported. The bus interface circuit 38 is comprised of a field programmable gate array configured to emulate the functions of Digital Equipment Corporation's DRV 11-WA circuit which is compatible with the Q-bus interface.

The four main sections 10, 12, 14, 16 of the decommutator architecture operate to synchronize the incoming data stream, split the incoming data stream by type of data, process and buffer the data, and then interface to the host system's bus.

The synchronization correlator section 10 receives the serial input data and locates the synchronization pattern in the input data. After the synchronization pattern is located, the data is stored in the RAM data storage buffer 26. The RAM data storage buffer 26 includes two storage banks 40 and 42. The data is first stored in bank 40 until the end of the data frame is located. When that occurs, bank 40 is switched to the data decommutation section 12 and data bank 42 becomes the input buffer. The synchronization correlator section 10 then looks for the next synchronization pattern and the process is repeated.

The data decommutation section 12 begins decommutating the data from data bank 40 while the synchronization correlator section 12 is storing the next frame in data bank 42. The serial data from the data storage buffer 26 is converted to variable length words under the control of the transputer 32. The serial-to-parallel converter circuit 30 is dynamically configured via the transputer 32 based on look-up tables in the transputer's memory. The data type is identified by its location within the frame and the particular frame type. The data words are read over data line 45 and buffered into blocks within the transputer 32. Each data block is tagged and then sent over transputer links 47 to the appropriate post processing transputer 36.

Alternatively, the data blocks can be sent over transputer links 53 through the transputer link switch 34 to be further decommutated through output bus 57.

The post processing transputers 36 buffer the incoming data blocks into their local RAM memory. Each of the processors has one or more processes to input, manipulate and output the data.

The bus interface circuit 38 allows the data from the post processing section 14 to be placed on the host system's bus.

Each of the sections of the decommutator architecture are designed to be generic and can be programmed to decommutate any synchronous serial data stream. This allows the decommutator architecture of the present invention to accommodate any future changes in data formats by simply downloading different software to appropriately configure the decommutator.

Modular Distortion Correcting SSM/I Imagery Decommutator

The operation of the decommutator of FIG. 1 as an SSM/I imagery decommutator will now be described.

Before the SSM/I data can be used, two levels of decommutation of the satellite output, i.e., the DMSP data stream, must occur. Then, the post processing transputers 36 apply temperature conversions, calibration, antenna corrections, earth curvature corrections and resampling for producing an OLS compatible image of the SSM/I imagery data.

Figure 3:
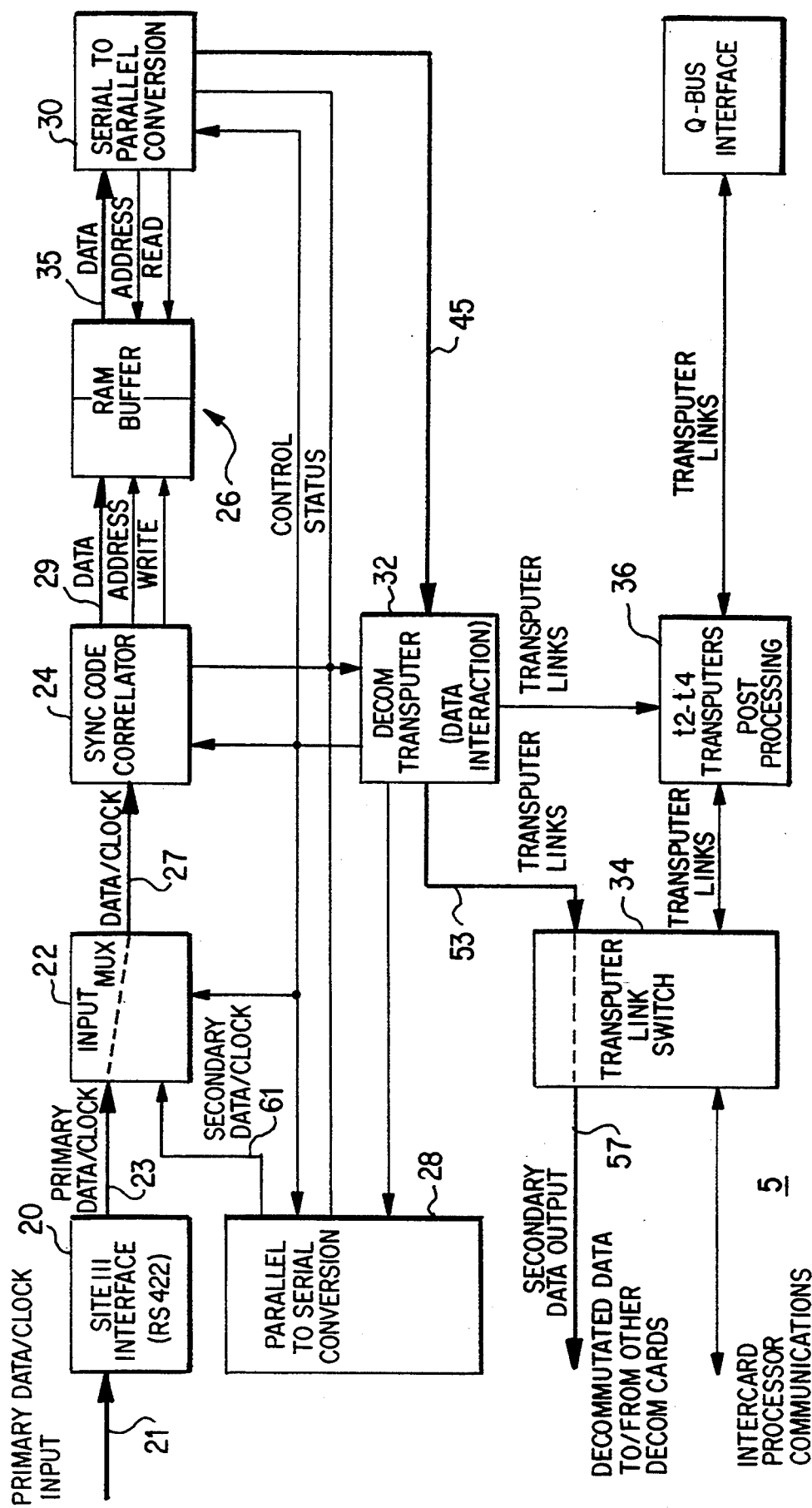
FIG. 3 is a data flow diagram through the architecture of FIG. 1 for primary DMSP data.
Figure 4:
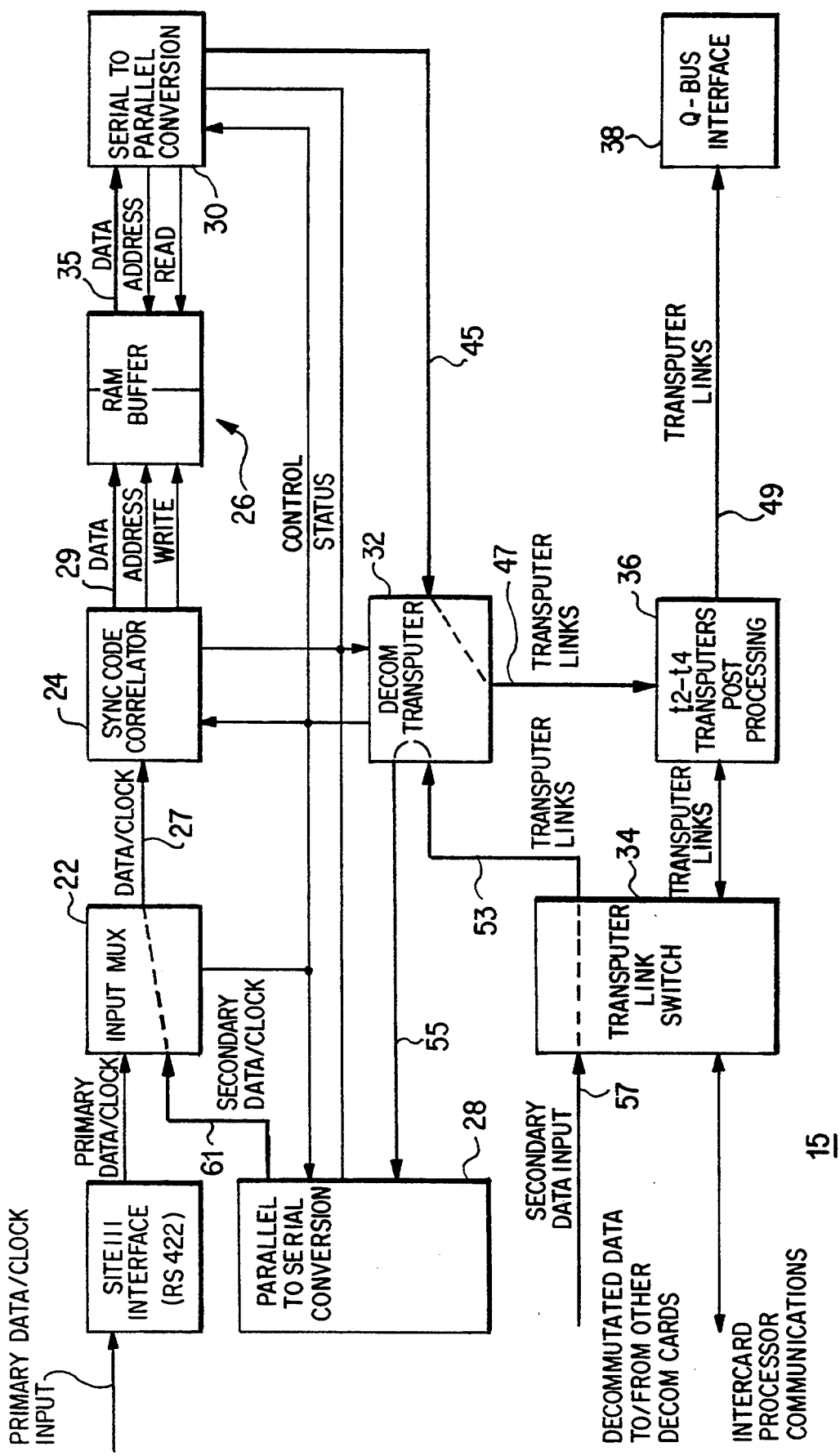
FIG. 4 is a data flow diagram through the architecture of FIG. 1 for secondary SSM/I data.

Referring to FIGS. 3 and 4, the functional flow of data through a two circuit card assembly implementation of the distortion correcting decommutator will be briefly described for decommutating SSM/I data.

FIG. 3 shows the data interface 20 accepting the digital data input stream 21 from a data source external to the decommutator. The external data source can be a satellite downlink or tape unit. The input MUX 22 receives the data stream 23 from the interface 20. The input MUX 22 is controlled by the transputer 32 and can be commanded to select either external data, i.e., line 23, or internal data, i.e., line 61. FIG. 3 shows the input MUX 22 accepting the external data over line 23 from the data interface 20 and routing the data to the synchronization code correlator 24 via line 27.

The synchronization code correlator 24 is a field programmable gate array controlled by the transputer 32. The purpose of the synchronization code correlator 24 is to accept the data from the input MUX 22, synchronize to the data stream, determine the RAMdata storage buffer 26 addresses and output the synchronized data to the RAM data storage buffer 26. The synchronization pattern, synchronization length, synchronization location and error threshold are all programmable.

Synchronization is accomplished, for example, by searching the incoming data frames for a specified bit synchronization pattern. Successful synchronization occurs when three consecutive errorless frame synchronization patterns are found. The format of the synchronization pattern and the data can be found in the DMSP Data Specification IS-YD-821B.

The RAM data storage buffer 26 accepts the synchronized serial data via line 29 from the synchronization code correlator 24. The RAMdata storage buffer 26 also accepts input addresses and write control signals from the synchronization code correlator 24. Further, the RAM data storage buffer 26 accepts output addresses and read control signals from the serial-to-parallel converter 30. The synchronization code correlator 24 fills one data bank of the RAM data storage buffer 26 while the serial-to-parallel converter 30 reads from the other data bank.

The serial-to-parallel converter 30 converts the synchronized data stream received from the RAM data storage buffer 26 via line 35 into parallel data and outputs the parallel data to the transputer 32 via line 45. The serial-to-parallel converter 30 has a programmable data inversion mask, programmable data zeroing mask and a programmable shift mask. The converter 30 can be programmed to reorder the data bits from least-significant to most-significant or vice versa. The programmable shift mask allows skipping of non-data locations and allows de-interleaving of an interleaved input data stream.

The transputer 32 accepts the parallel data words via bus 45 from the serial-to-parallel converter 30 and stores them one scan line at a time. Depending on the current programming, transputer 32 may either transfer the data to the transputer link switch 34 for routing to a secondary level circuit card assembly (FIG. 4) or to the post processing transputers 36 for additional processing and data formatting.

As shown in FIG. 3, from the transputer 32, the data is transferred to the transputer link switch 34 via line 53. The transputer link switch 34 is a twenty megabit per second serial data switching and transfer circuit. The transputer link switch 34 is controlled via one of the post processing transputers 36 and can provide either interprocessor or intercard communications. The switching capabilities of the transputer link switch 34 are reconfigurable during the decommutation process. Because data can be transferred via the transputer link switch 34 to either local transputers 36 or transputers located on another circuit card assembly, full utilization of all the transputers is provided. This allows processing to be off-loaded from a transputer that is overworked to one that is only partial utilized.

The SSM/I data which is extracted from the input data stream is then transferred out of the first circuit card assembly 5 via external port 57 from the transputer link switch 34. At this point, the SSM/I data has been extracted from the OLS data stream but still requires a second level of synchronization.

Referring to FIG. 4, a second circuit card assembly 15 for performing a second level of commutation is provided. This circuit card assembly receives the extracted SSM/I data via external port 57 into the transputer link switch 34. The transputer link switch 34 routes the data to the transputer 32 via line 53. Because of the programming of the transputer 32, the transputer 32 transfers the incoming data from the transputer link switch 34 to the secondary parallel-to-serial conversion circuit 28 via line 55.

The secondary parallel to serial converter 28 accepts and converts the parallel data back into serial form so that it can be routed through the input multiplexer 22 via line 61, thus beginning the search for the synchronization code for the second level of decommutation. From the input MUX 22, the data is routed to the synchronization code correlator 24 via line 27 as was performed for the initial data stream shown in FIG. 3.

Again, the synchronization code correlator 24 synchronizes up to the data and the synchronized data is then output to the RAM data storage buffer 26 via line 29. The data is read out of the RAM data storage buffer 26 by the serial-to-parallel conversion circuit 30 and is then transferred to the transputer 32.

At this point, decommutation of the data is complete. Transputer 32 transfers the data to the post processing transputers 36 via line 47 for post processing. The post processing applications performed by the post processing transputers 36 will be described in greater detail below. Because of the parallel and pipelined capabilities of the circuit card assemblies 5, 15, the post processing applications can be performed in real-time.

From the post processing transputers 36, the data is transferred via a transputer link 49 to the bus interface 38.

As noted above, a more detailed description of the universal downloadable decommutator architecture is described in application Ser. No. 07/820,490, filed on even date herewith.

The post processing applications include temperature conversion and calibration, antenna pattern correction, earth curvature corrections and data reformatting. The temperature conversion and calibration and antenna pattern correction post processing are performed via algorithms provided by the DMSP Special Sensor Microwave/Imager Calibration/Validation Report, published by the Naval Research Laboratory, Washington, DC.

The temperature conversion and calibration algorithm converts the raw quantized data to degrees Kelvin and adjusts the data based on calibration targets and precision temperature sensors having numeric values that are included in the data stream provided from the satellite. The data stream from the satellite is defined in Vendor No. 97942, Specification No. 9RA7272.

The antenna pattern correction algorithms adjust the temperature values to correct for antenna feedhorn spillover, cross-polarization coupling, and sidelobe contribution. The present invention has the advantage of performing the temperature conversion and calibration and the antenna pattern correction in real-time using the pipelined and parallel capabilities of the post processing transputers 36 in the modular distortion correcting real-time SSM/I imagery decommutator.

Figure 5:
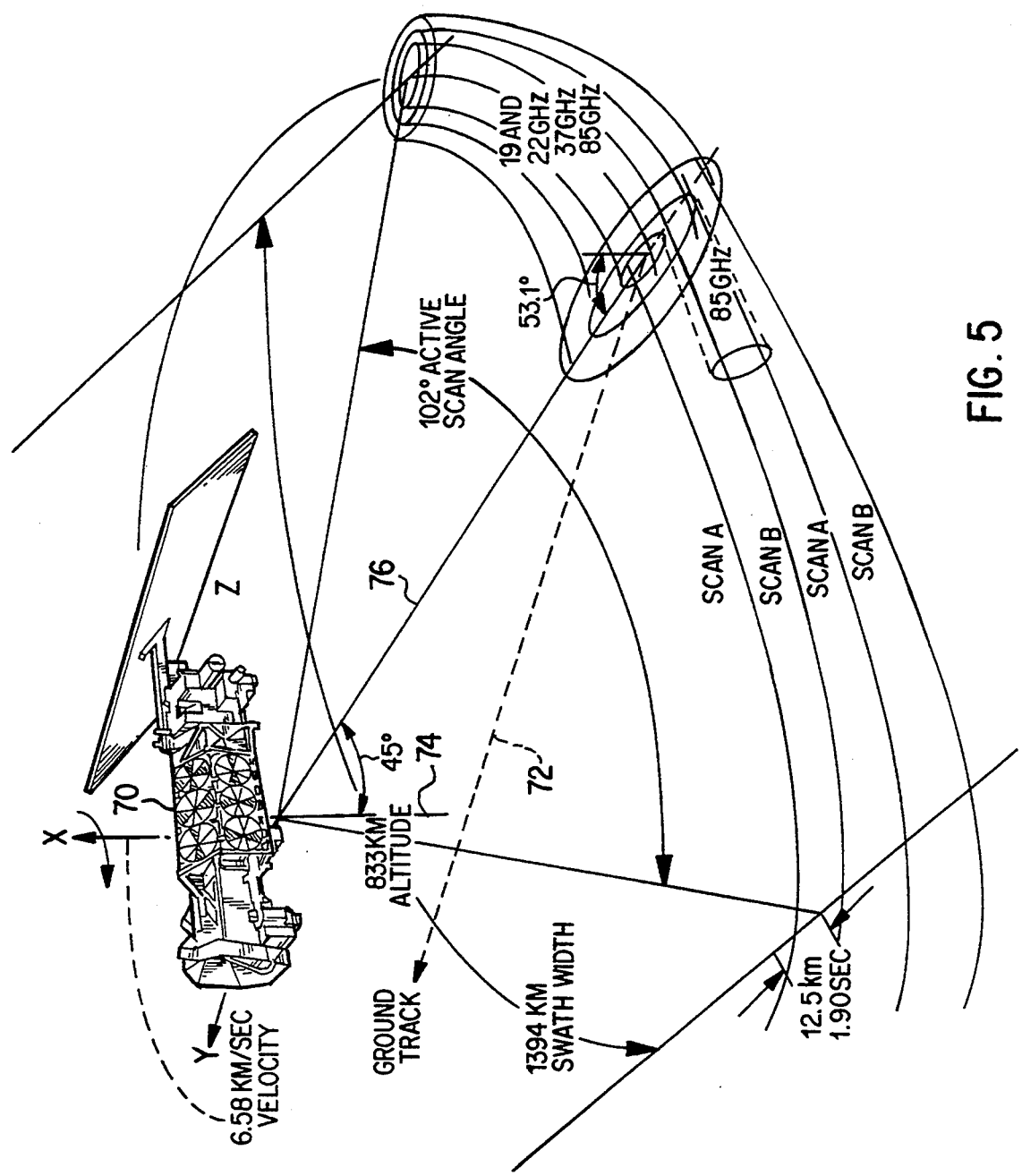
FIG. 5 is a diagram illustrating the scan lines for the SSM/I and OLS sensors.

Referring to FIG. 5, there is shown a satellite 70 covering a ground track 72. The satellite 70 includes an OLS sensor which points directly down at the center of the earth as indicated by line 74. In contrast, an SSM/I sensor is directed out of the end of the satellite at a 45° angle to the vertical, as indicated by 76, such that at any one point in time, the two images recorded by the different sensors are for different locations.

The earth curvature correction algorithms utilize the satellite's location data, i.e., latitude, longitude and altitude, spherical trigonometry, and time of data acquisition to resample uncorrected SSM/I imagery. This produces a new scan line which has a constant resolution and relates to the same location as the infrared and visual OLS imagery. The earth curvature corrections thus remove the distortions due to the orientation of the SSM/I sensor to produce an image and have the image transformed into the same image space as that of the OLS data such that the images may be overlaid or combined as will be described below.

In order to correct for distortions at the edges caused by the curvature of the earth, the OLS data is resampled to remove some of the pixels located near the center of the scan and is interpolated to add additional pixels toward the edge of the scan. To allow more of the image to be displayed, pixels may be decimated, for example, standard decimations being 2:1, 4:1, 8:1 and 16:1.

At the same time as the OLS sensor is capturing an image of the earth, the SSM/I sensor is also capturing an image. However, the SSM/I image does not point toward the center of the earth as noted above. Rather, it points out of the back of the spacecraft at a 45° angle as indicated by 76. This results in an image that is distorted in both the long track and cross track directions. The earth curvature correction algorithm resamples the SSM/I data to remove these distortions. Next, the image is adjusted to compensate for the fact that the SSM/I image was not directly below the satellite when it was captured. Because the SSM/I sensor points out of the back of the satellite 70 at a 45° angle, the sensor looks at a point on the earth that the satellite previously passed over at some time period before. Also, during that time interval between when the OLS image was taken and the SSM/I image was taken, the earth has rotated a predetermined amount. Therefore, the SSM/I image is corrected by adjusting the time of the image and by compensating for the rotation of the earth during the interval between when the OLS image was captured and when the SSM/I image was captured.

Figure 6:
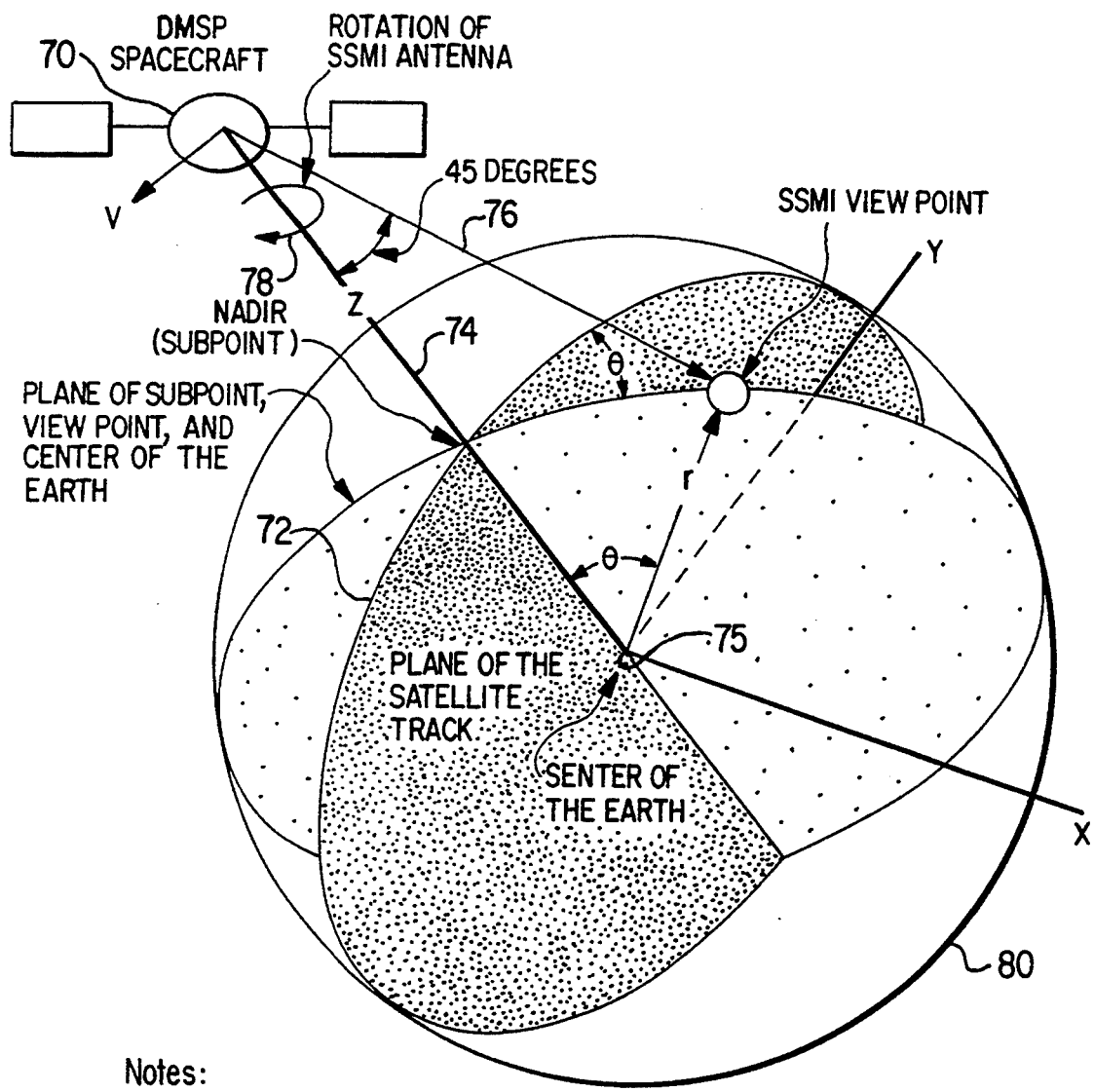
FIG. 6 is a geometric diagram illustrating the calculation of the earth curvature correction tables.

Referring to FIG. 6, there is shown the geometry necessary to produce the earth curvature correction tables used in the SSM/I decommutator. The DMSP spacecraft 70 is shown in relation to the earth 80. The angle theta ($\theta$) is shown between the satellite track 72 and the bore sight of the SSM/I sensor. Both the plane containing the satellite track 72 (shaded grey) and the plane containing the vector R, from the center of the earth 75 (dotted plane), are considered to be great circles. If the height of the spacecraft 70 is known (the altitude being given as a satellite parameter in the DMSP data stream), then the altitude and the 45° angle offset of the SSM/I antenna are used to determine the central angle ($\Phi$) at the center of the earth. Because the SSM/I antenna rotates clockwise (viewed from above) about the vertical axis Z at a constant velocity as indicated by arrow 78 and the time interval between pixels along a scan line is constant, the angle $\theta$ can be determined from the pixel number in the scan line. Therefore, the two angles $\theta$ and $\Phi$ are used to determine the three vectors in a right-hand orthogonal coordinate system necessary to correct for the geolocation difference of the sensors.

Figure 7:
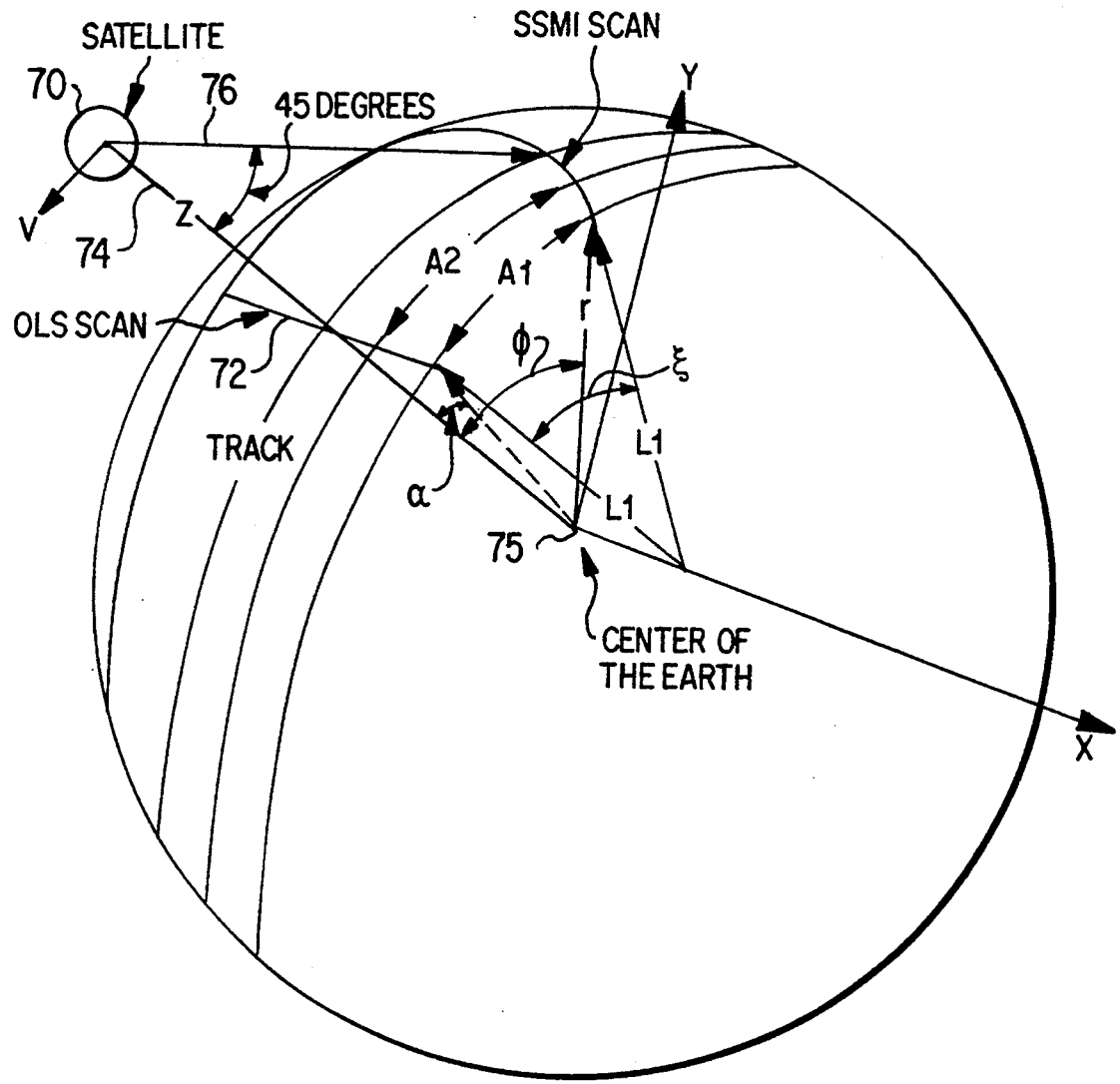
FIG. 7 is another geometric diagram illustrating the calculation of the earth curvature correction tables.

Referring to FIG. 7, once the three orthogonal vectors are determined, the arc distances $A_n$ (n=1, 2, 3, ..., 64) from the OLS scan line to each individual SSM/I pixel can be determined. The arc distances $A_n$ are then used to generate resampling tables so that the raw SSM/I data can be resampled, i.e., earth curvature corrected, to map into the OLS image space. The resampling tables are provided in Appendix A and an example is shown below:

| | |
|---|---|
| - 1st Entry<br>- ie 1st Pixel Entry<br>- VALUE 47 corresponding<br>  to Altitude of 467nmi | [−128,−128,−128,−128,−128,<br>−128,−128,−128,−128,−128,<br>−128,−128,−128,−128,−128,<br>−128,−128,−128,−128,−128,<br>−128,−128,−128,−128,−128,<br>−128,−128,−128,−128,−128,<br>−128,−128,−128,−128,−128,<br>−128,−128,−128, 1, 1,<br>0, 1, 1, 2, 2,<br>2, 3, 3, 4, 4,<br>4, 5, 5, 6, 6,<br>6, 7, 7, 7, 8,<br>8, 9, 9, 9,<br>c<br>c<br>c |
| - 128th Entry | −128,−128,−128,−128,−128,<br>−128,−128,−128,−128,−128,<br>−128,−128,−128,−128,−128,<br>−128,−128,−128,−128,−128,<br>−128,−128,−128,−128,−128,<br>−128,−128,−128,−128,−128,<br>−128,−128,−128,−128,−128,<br>−128,−128,−128, 126, 126,<br>127, 126, 126, 125, 125,<br>125, 124, 124, 123, 123,<br>123, 122, 122, 121, 121,<br>121, 120, 120, 120, 119,<br>119, 119, 118, 118, |
| - 129th Entry<br>- ie 1st line entry | −25, −25, −25, −24, −24,<br>−24, −24, −23, −23, −23,<br>−23, −22, −22, −22, −21,<br>−21, −21, −21, −20, −20,<br>−20, −20, −19, −19, −19,<br>−18, −18, −18, −18, −17,<br>−17, −17, −17, −16, −16,<br>−16, −15, −15, −26, −26,<br>0, −26, −25, −24, −24,<br>−24,   −23, −22, −21,<br>−21, −20, −20, −19, −19,<br>−18, −17, −17, −17, −16,<br>−16, −15, −14, −14, |
| - 130th Entry<br>- ie 2nd Line Entry | −25, −25, −25, −24, −24,<br>−24, −24, −23, −23, −23,<br>−23, −22, −22, −22, −21,<br>−21, −21, −21, −20, −20,<br>−20, −20, −19, −19, −19,<br>−18, −18, −18, −18, −17,<br>−17, −17, −17, −16, −16,<br>−27, 0, 0, −26, −26,<br>−25, −25, −24, −24, −23,<br>−22, −22, −21, −21, −21,<br>−20, −19, −19, −18, −18,<br>−18, −17, −16, −16, −15,<br>−15, −14, −13, −13,<br>c<br>c<br>c |
| - 256th Entry | −25, −25, −25, −24, −24,<br>−24, −24, −23, −23, −23,<br>−23, −22, −22, −22, −21,<br>−21, −21, −21, −20, −20,<br>−20, −20, −19, −19, −19,<br>−18, −18, −18, −18, −17,<br>−17, −17, −17, −16, −16,<br>−16, −15, −15, −26, −25,<br>−26, −25, −25, −24, −24,<br>−23, −22, −22, −21, −21,<br>−21, −20, −19, −18, −18,<br>−18, −17, −16, −16, −15,<br>−15, −15, −14, −133: |

The ECC table is used to resample data from a raw data file to an earth curvature corrected data file. Each line of either file consists of 128 pixels. ENTRIES in the ECC table consist of 64 VALUES. Each of the 64 VALUES corresponds to an altitude, the general form of the equation being VALUE=(Altitude−375)/2+1. Thus the 1st value corresponds to an altitude of 375 nmi., the second 377 nmi., ..., 501 nmi. The first 128 ENTRIES correspond to the number of a pixel in the raw data file. The second 128 ENTRIES correspond to the number of a line in the raw data file. By using the table one can determine which pixel (RAW_PIXEL) and which line (RAW_LINE) of the raw data to use for a particular pixel and line of the corrected file. The appropriate formula for DMSP F08 is RAW_LINE=-FIXED_LINE_OFFSET +LINE_NUMBER_OFFSET+CURRENT_LINE_NUMBER. The appropriate formula for DMSP F10 is RAW_LINE=CURRENT_LINE_NUMBER—FIXED _LINE_OFFSET—LINE_NUMBER_OFFSET. FIXED_LINE_OFFSET is a constant, 75.

For example, to determine the 1st pixel of the 500th line of the converted data at an altitude of 467 nmi for a DMSP F08 pass, first calculate the VALUE, in this case (467−375)/2+1=47. Then select the 47th VALUE of ENTRY 1 as the pixel number in the raw data, in this case RAW_PIXEL=3. Then select the 47th VALUE of ENTRY 129 as the LINE_NUMBER_OFFSET, in this case −23. The RAW_LINE=(75+(−23)+500) or RAW_LINE=552. Therefore, the correct value for the 1st pixel of the 500th line of the converted data is the 3rd pixel (RAW_PIXEL=3) of the 552nd line (RAW_LINE) of the raw data. If the VALUE is −128 for the RAW_PIXEL then copy a zero as the pixel value.

Part of this resampling process requires adding fill data, e.g., zeros, to skew the SSM/I imagery so that it appears as though it is beneath the spacecraft, i.e., on the OLS linear scan line. A complete set of earth curvature correction tables is generated and loaded into the decommutator for various altitudes, for example, 375-501 nautical miles at 2.0 nautical mile increments, for a total of 64 sets. Each set designates a line and pixel number for an entire SSM/I scan line.

A constant line offset of seventy-five and a variable pixel offset to correct the pixel number for earth rotation must also be added to each earth curvature correction table set at the implementation of these tables. The variable pixel offset values are as follows:

| DEGREES LATITUDE | OFFSET VALUE |
| --- | --- |
| 0.0 TO ±27 | 5 |
| ±28 TO ±46 | 4 |
| ±47 TO ±60 | 3 |
| ±61 TO ±72 | 2 |
| ±73 TO ±84 | 1 |
| ±85 TO ±90 | 0 |

Accordingly, as the spacecraft 70 moves the distance of $A_1, A_2, \ldots, A_n$, a new file is created from the original SSM/I data, through resampling, that will fit into the OLS image space. This allows the overlay of one image onto the other. The resampling process accounts for the SSM/I antenna offset at both constant and varying satellite altitudes.

The data formatting is performed after the SSM/I imagery has been earth curvature corrected. Once the earth curvature correction is performed, the SSM/I data overlays the OLS decimated imagery allowing direct comparison and analysis. The data is reformatted for transfer to the host processor (not shown). The data may be formatted and transferred line by line or it can be buffered and transferred in a "cell" format. A cell is defined as a block of data consisting of 64 lines of 256 pixels each. The cell format allows a very rapid retrieval of data thus reducing the time required to display the imagery after it is requested.

Producing Special Sensor Applied Meteorological Images

After the SSM/I data has been corrected to overlay the OLS decimated imagery, the images may be fused into a single image which is readily interpretable by the user as will be described below.

Figure 8A:
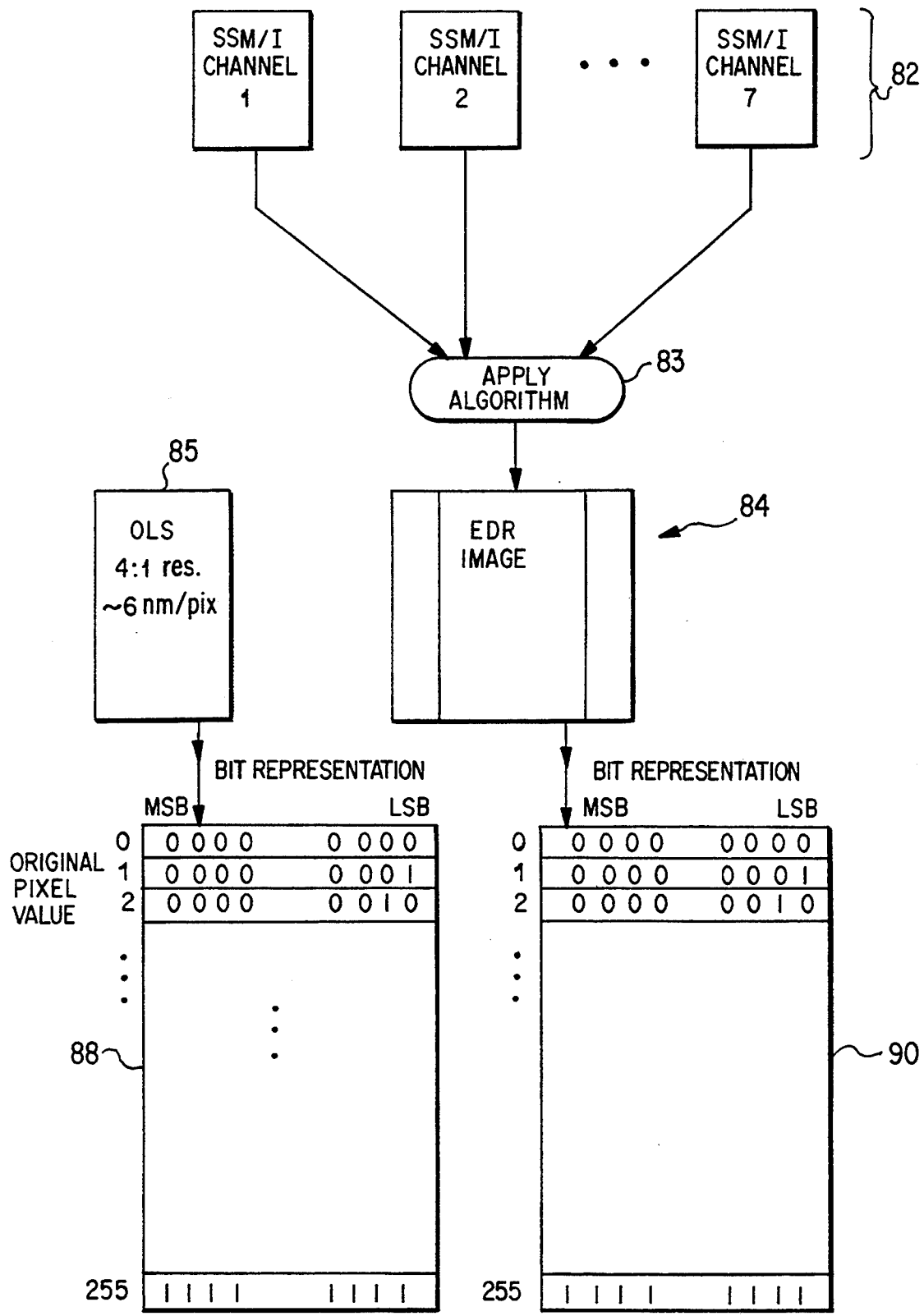
FIGS. 8A–8E are block diagrams illustrating, by way of an example, the creation of an SSAMI image according to the present invention.

Referring to FIG. 8A, in order to create the environmental data records (EDRs) 84 to be embedded in the OLS visual or thermal image 85, predetermined algorithms 83 are applied to at least two of the seven different SSM/I data channels 82. The algorithms 83 were developed by Hughes Corporation under the supervision of the Space Sensing Branch of the Naval Research Laboratory, Washington, DC, and were published in the Special Sensor Microwave/Imagers Users Guide. Algorithms were developed for each environmental data record and, for example, generally take the form of equations such as given below for oceanic wind speed.

approximately six nautical miles/pixel 85. The output of the algorithms 83 are numerical values in the appropriate units for the phenomenon evaluated. The EDR 84 thus produced has a one-to-one correspondence with the OLS image 85. Continuing the example for oceanic wind speed, the output image would be expressed in knots. The output image can be color enhanced by defining for each pixel value (or group of pixel values) a color. In doing this, the user obtains an easily interpreted visual representation.

Because the SSM/I sensor produces data points which are in a twelve-bit format, and most display devices utilize eight bits for each data point, the data points must be converted from twelve bits to eight bits. This is accomplished by applying a linear ramp to the twelve-bit data points.

As shown in the example of FIG. 8A, the OLS image 85 contains a pixel value range of 0–255 as shown in block 88. Each pixel value 0–255 is represented by a byte of data. Likewise, the EDR block 84 also contains a pixel value range of 0–255 as shown in block 90.

At this point, because the EDR image 84 matches the resolution of the OLS image space 85, as described above through the use of the distortion correcting SSM/I decommutator, it is now possible to embed the EDR into the OLS data to produce a single combined image known as a special sensor applied meteorological image (SSAMI). Initially, the user selects the significant features of the EDR image 84 that he wishes to include in the SSAMI image. For example, surfaced wind speed in excess of twenty-five knots is known to create hazards for ships. Therefore, the twenty-five knot value can be a critical value for meteorologists. Further, it is known that the maximum reliable measured wind speed is approximately one hundred knots. Because of these known facts, the pixel values in the range of 25–100 knots generated for the surface wind speed EDR, measured in knots, can be used as the significant features of the EDR.

Figure 8B:
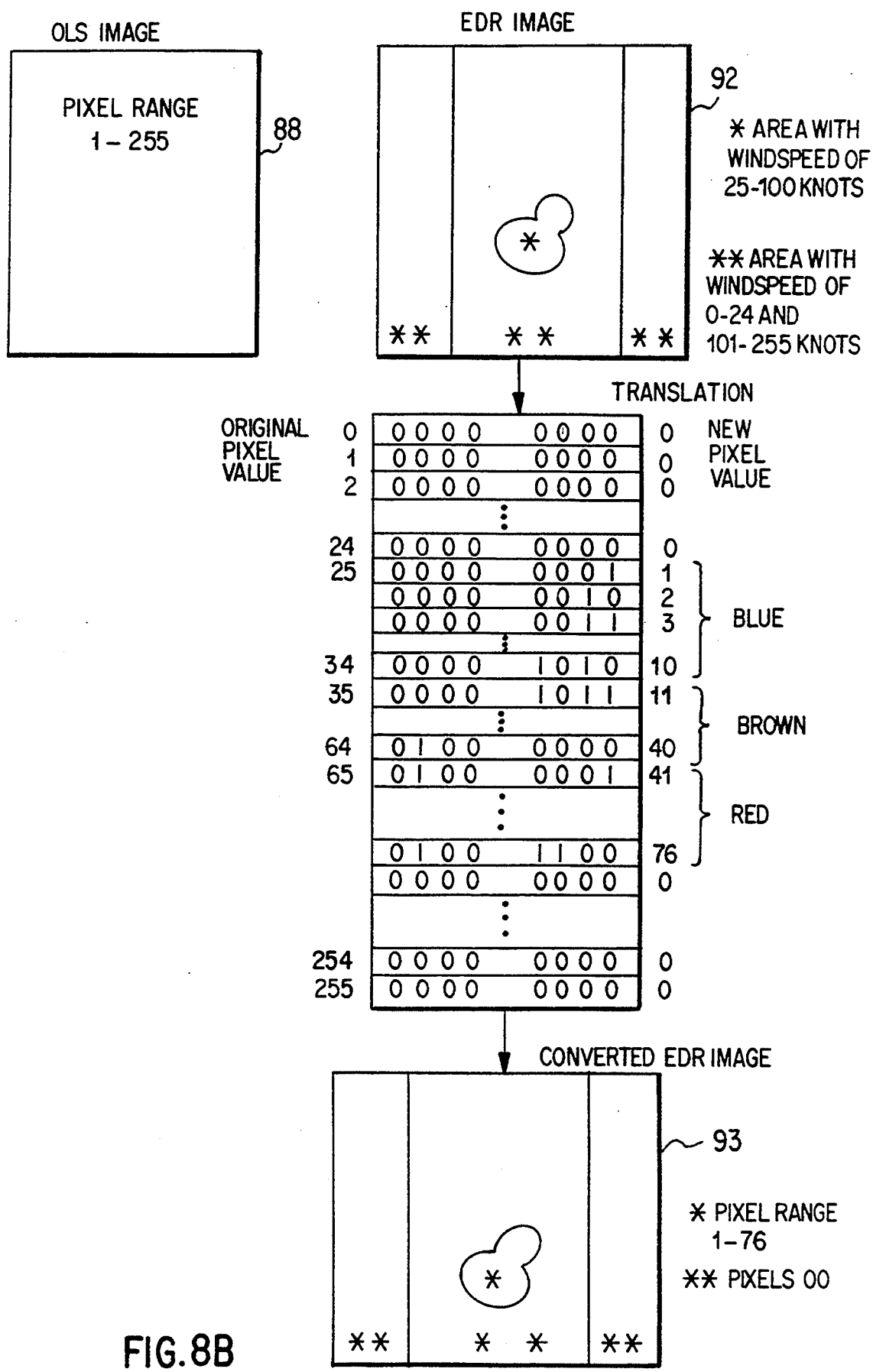

Next, as shown in the example of FIG. 8B, the user thresholds the wind speed data for values in the critical range. This procedure produces an image 92 wherein the pixels representing wind speeds in the significant range of 25–100 knots are converted to pixel values in the range of 1–76, while all other pixels, i.e., 1–24 and 101–255, are replaced with a zero value.

Next, the thresholded data is color enhanced with the intention of incorporating it into the OLS data image 88. For example, small craft advisories are issued when winds are in the range of 25–34 knots. Therefore, the pixel range of 1–10 (i.e., corresponding to 25–34 knots) can be assigned color values of various shades of blue. Gale force winds are in the region of 35–64 knots. Therefore, the pixel range of 11–40 (corresponding to 35–64 knots) can be assigned color values of various shades of brown. Further, hurricane force winds are Oceanic Wind Speed = 147.90 + 1.0969*19GHZ_Vertical_Brightness_Temperature −
0.4555*22GHZ_Vertical_Brightness_Temperature −
1.7600*37GHZ_Vertical_Brightness_Temperature +
0.7860*37GHZ_Horizontal_Brightness_Temperature (The symbol * indicates the arithmetic function of multiplication)

The EDRs 84 consist of a data point for each location selected. Because images have been used for inputs, the outputs are data points that co-locate with the OLS decimated visual or IR imagery, for example, co-locating with OLS 4:1 resolution imagery having images of issued when the winds are in excess of 65 knots. These pixels, i.e., pixels 41–76 which corresponds to wind speed values greater than 65 knots, can be assigned various shades of red. The assignment of colors is accomplished through a color enhancement table which assigns each pixel value a color.

By converting the image into low integer values, "bleedover" can be avoided at later stages in the combination with the OLS image. At this point, the EDR image 93 data is represented by an image wherein the significant EDR values are low non-zero integral pixel values and the non-significant values are zeros.

Figure 8C:
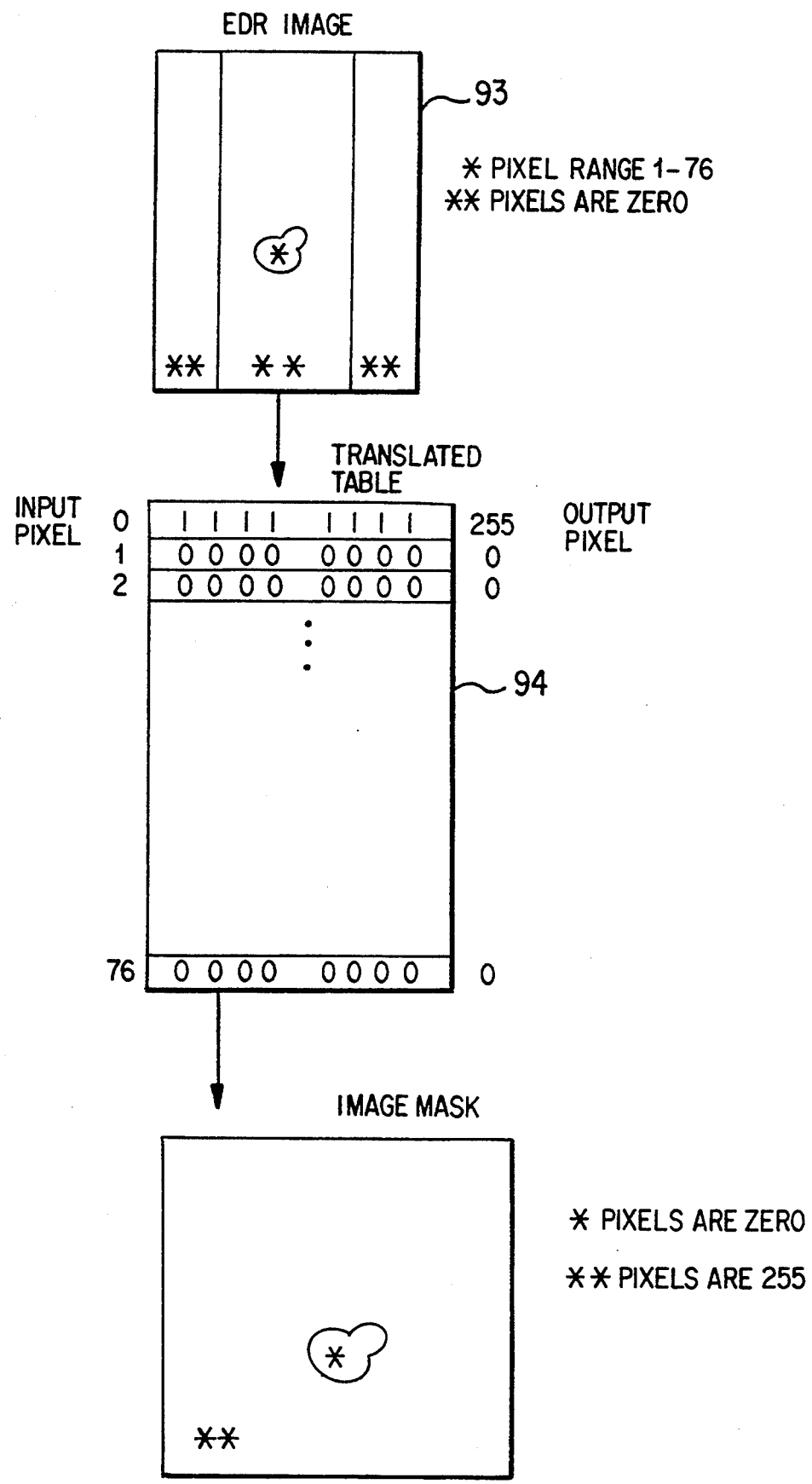

The converted EDR image 93 is then used to create an image mask. This is accomplished as shown in FIG. 8C, by creating a translation table 94 in which each significant pixel value, e.g. pixels 1–76 in the converted EDR image 93, is converted to a value of zero while all other original pixel values, i.e., pixels 0 and 74–255 are converted to a value of two hundred fifty-five (corresponding to each bit being set to one). This conversion is accomplished through a look-up table transformation. The image mask 96 now has all bits set for the locations of non-significant values of the EDR and has zeros at locations of significant values.

The OLS image data 88 is then scaled into a different pixel range. The OLS image is scaled such that all pixels (0–255) in the image are converted to the range extending from the largest integral value of the EDR image's values plus one (in our example 76+1=77) to the maximum value supported by the display device (in our example 255). The scaling for our example is accomplished via the equation:

$$\frac{\text{original pixel} \times (255 - 77)}{255} + 77 = \text{new pixel}.$$

Figure 8D:
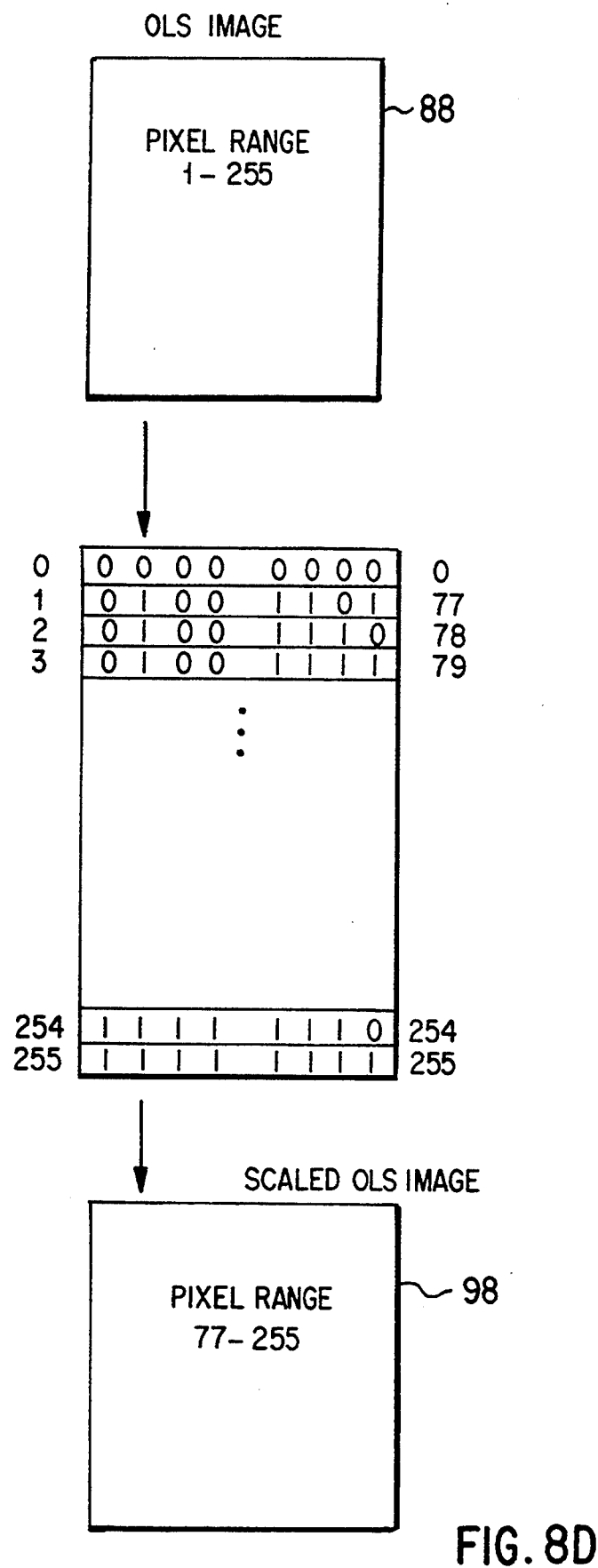

In this manner, it is assured that the significant EDR pixels (1–76) and the OLS pixels (77–255) are distinct sets, i.e., they have no pixels in common. FIG. 8D shows the shifted and compressed OLS data image space 98 in which the OLS pixels are scaled into the pixel range of 77–255.

Figure 8E:
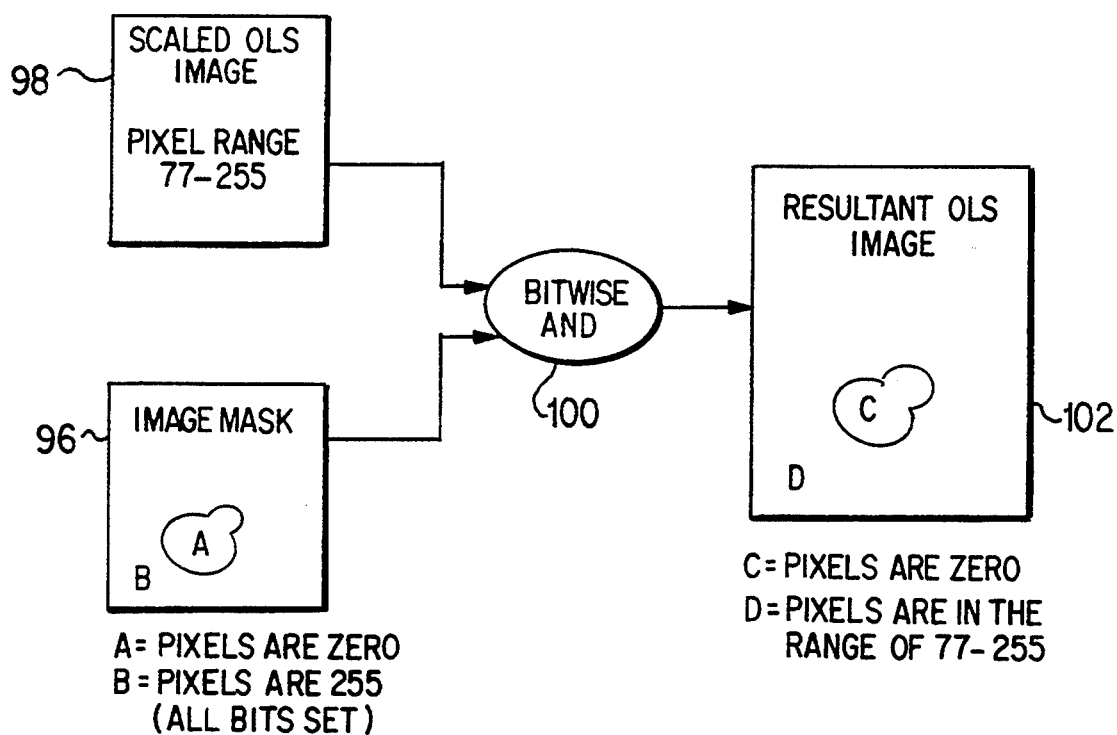
Figure 8E:
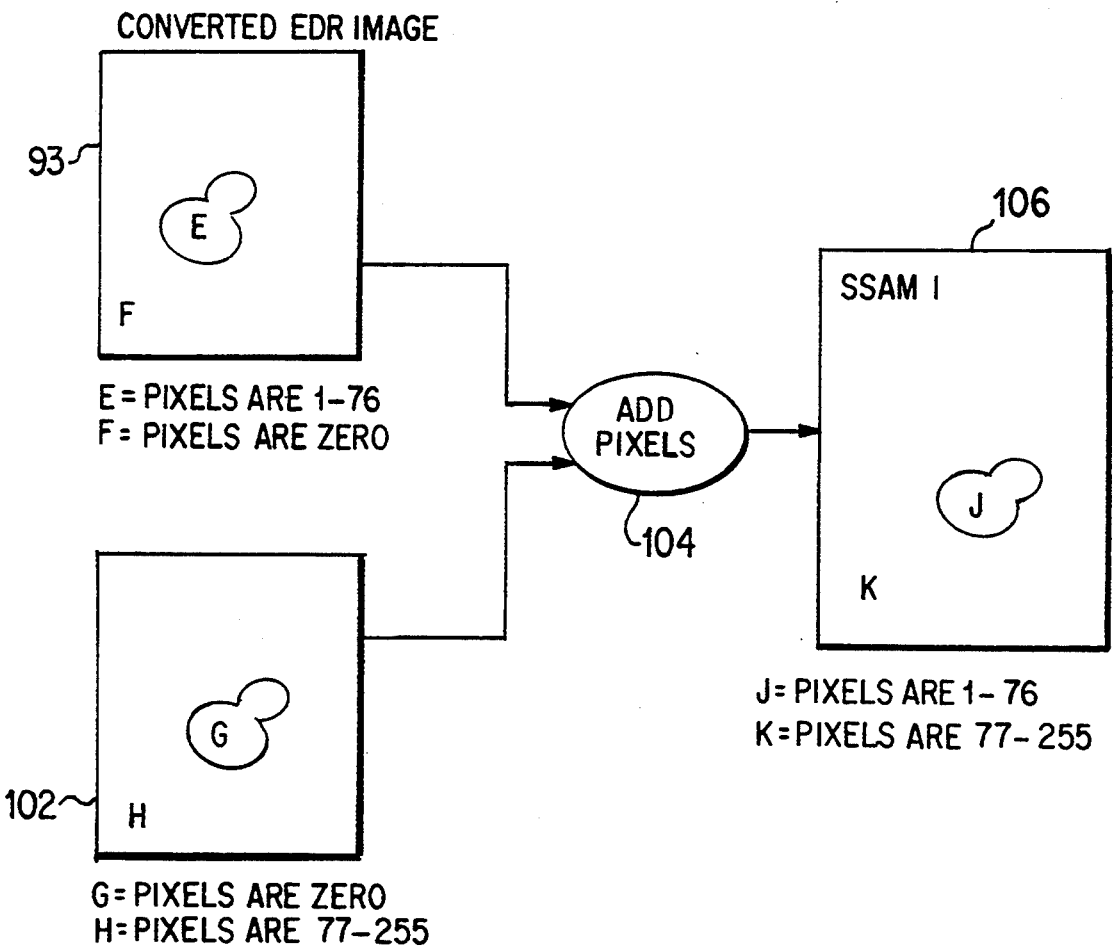

Next, the image mask 96 is bit wise ANDed 100 with the OLS scaled image 98. Where all bits are set in the image mask 96, the pixel values from the OLS image are retained. Where zeros are located in the image mask 96, the pixel values of the OLS image are reduced to zero. This results in an OLS image 102 that has the pixels of significance for the EDR image set equal to zero and the pixels of non-significant EDR values retaining OLS values as shown in FIG. 8E.

At this point, two images 93 and 102 have been created. Each of the images is a distinct non-overlapping set. The converted EDR image 93 has small non-zero integer pixel values at all points where there was significant EDR data. The rest of the EDR image 93 consists of zero pixel values. The OLS image 102 has zero pixel values wherever there was a significant value in the EDR image 93 and the original OLS pixel values, albeit in a scaled format, everywhere there was a non-significant value in the EDR image 93. The two images 93, 102 are then added 104 to replace the zeros in the two images with significant data. Because of the use of the image mask 96, the addition step 104 always results in the addition of an integer value and a zero value which thus maintains two distinct sets within a single output image 106.

At this point, the output image 106 consists of a low integral range of pixel values indicating the significant EDR values (in our example pixels 1–76 indicate wind speed) to which we assign colors and a higher range of OLS values (in our example 77–255) to which are assigned grey shades. The combined image is the special sensor applied meteorological image (SSAMI).

Additional significant EDR values can be added to the produced SSAMI using a similar procedure. For example, significant amounts of precipitation can be added to the example shown in FIGS. 8A–8E. The procedure begins with the creation of another EDR and proceeds in a similar manner to be combined with the already produced SSAMI image 106 which acts as the original image. Only one additional step is necessary. The color enhancement table created for the various pixel ranges must be ramped to adjust for the increase in pixel values caused by the ramping of the EDR values embedded within the SSAMI. With that additional step, the process for adding other significant EDR values remains the same.

Further EDR information can be added to the SSAMI indefinitely, with the only limitation being the amount of compression tolerable for the OLS visual and thermal images.

While the example given above represents the EDRs with colors and the OLS data in grey shades, it is readily understood that colors can be used for both images.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for applying earth curvature corrections to operational line scan image (OLS) data and special sensor meteorological image (SSM/I) data in a data decommutator, generated by OLS and SSM/I sensors scanning the earth's surface, the method comprising the steps of:
   resampling the OLS image data to remove a plurality of image pixels near a center of a scan line and to interpolate an additional plurality of pixels toward an edge of the scan line;
   resampling the SSM/I data to remove long track and cross track distortions caused by the SSM/I sensor scan angle; and
   adjusting the resampled SSM/I data to compensate for a scan position of the SSM/I sensor.

2. A method according to claim 1, wherein the step of adjusting the resampled SSM/I data includes the steps of:
   adjusting a time period at which the SSM/I data for a particular geolocation is generated to correlate with when the OLS data for said geolocation is generated; and
   compensating the SSM/I data for the earth's rotation which occurred during the time period between the generation of the OLS data and the SSM/I data.

3. A method according to claim 2, wherein said earth curvature corrections are performed in real-time using pipelined and parallel processing microcomputers.

4. A method according to claim 1, wherein the image pixels are decimated to allow a greater image to be displayed.

5. A method according to claim 1, wherein the image pixels are decimated by at least one of 2:1, 4:1, 8:1 and 16:1.

6. In a system including first and second sensors orbiting substantially above a planet for scanning the planet's surface to generate first and second sensor data, respectively, the first and second sensors scanning different geolocations at any one point in time, a method for using the first and second sensor data, the method comprising the steps of:

mapping one of said first and second sensor's data to correspond with a particular geolocation for the other of said first and second sensor's data, each of said first and second sensor's data being generated asynchronously to the others; and overlaying the mapped sensor's data onto the other of said first and second sensor's data;

using said overlayed first and second sensor's data together.

7. A method according to claim 6, wherein said first sensor is a SSM/I sensor and said second sensor is an OLS sensor, the step of mapping and overlaying including the steps of:

curvature correcting the OLS sensor data for a cross track direction; and curvature correcting the SSM/I sensor data for both a cross track and a long track direction.

8. A method according to claim 6, wherein said mapping step includes the further step of resampling said first sensor's data using resampling tables to fit said first sensor's data into the second sensor's data image space.

9. A method according to claim 8, wherein said step of resampling includes the step of skewing the first sensor's data using curvature correction tables such that the first sensor's data corresponds to particular geolocations of the second sensor's data.

10. A method for displaying an OLS data image from an OLS sensor and at least one environmental data record (EDR) image obtained from an SSM/I sensor, for a particular geolocation, the method comprising the steps of:

embedding at least one EDR image into the OLS data image for a particular geolocation to produce a single combined image; and displaying the single combined image.

11. A method according to claim 10, wherein the step of embedding comprises the steps of:

converting the EDR data image into a displayable EDR image;

thresholding the displayable EDR image to produce a converted EDR image retaining only selected EDR data within the EDR data image;

shifting the converted EDR image into a lowest ordered pixel value range;

creating an image mask from the converted EDR image;

shifting and compressing the OLS data image into a range not occupied by the converted EDR image;

masking the shifted and compressed OLS data image with the image mask to produce a masked OLS data image; and adding the converted EDR image to the masked OLS data image to produce the single combined image.

12. A method according to claim 11, wherein the sensor generates SSM/I data images having twelve bit data points, the step of converting including the step of reducing the twelve bit data points to eight bit data points for display by an eight bit display device.

13. A method according to claim 11, wherein the step of thresholding includes the step of selecting significant EDR data to form the threshold image.

14. A method according to claim 13, wherein the step of thresholding further includes the step of converting pixel values for the selected significant EDR data and setting equal to zero all other pixel values.

15. A method according to claim 11, further including the step of enhancing the converted EDR image with different colors for various portions of the image after creating the converted EDR.

16. A method according to claim 15, wherein the step of enhancing includes the step of assigning each pixel value in the threshold image a particular color based on a color enhancement look-up table.

17. A method according to claim 16, further including the step of modifying the color enhancement look-up table to compensate for the shifting step.

18. A method according to claim 11, wherein the step of creating an EDR image mask includes the step of:

replacing the pixel values for the selected EDR data in the converted EDR image with a value in which each bit comprising the value is set equal to one to create an interim mask.

19. A method according to claim 11, wherein the step of masking includes the step of ANDing EDR image mask pixel values with scaled OLS data image pixel values.

20. A method according to claim 11, further comprising the step of embedding a second EDR image into the single combined image.

21. A data decommutator for applying earth curvature corrections to operational line scan image (OLS) data and special sensor meteorological image (SSM/I) data, generated by OLS and SSM/I sensors scanning the earth's surface, the decommutator comprising:

means for resampling the OLS image data to remove a plurality of image pixels near a center of a scan line and to interpolate an additional plurality of pixels toward an edge of the scan line;

means for resampling the SSM/I data to remove long track and cross track distortions caused by the SSM/I sensor scan angle; and means for adjusting the resampled SSM/I data to compensate for a scan position of the SSM/I sensor.

22. A decommutator according to claim 21, wherein the means for adjusting the resampled SSM/I data includes:

means for adjusting a time period at which the SSM/I data for a particular geolocation was generated to correlate with when the OLS data for the same geolocation was generated; and means for compensating the SSM/I data for the earth's rotation which occurs during the time period between the generation of the OLS data and the SSM/I data.

23. A decommutator according to claim 22, wherein said curvature corrections are performed in real-time using pipelined and parallel processing microcomputers.

24. In a system including first and second sensors orbiting substantially above a planet for scanning the planet's surface to generate first and second sensor data, respectively, the first and second sensors scanning different geolocations at any one point in time, a decommutator for using the first and second sensor data, the decommutator comprising:

means for mapping one of said first and second sensor's data to correspond with a particular geolocation for the other of said first and second sensor's data, each of first and second sensor's data being generated asynchronously to the others; and means for overlaying the mapped sensor's data onto the other of said first and second sensor's data;

means for using said overlayed first and second sensor's data together.

25. A decommutator according to claim 24, wherein said first sensor is a SSM/I sensor and said second sensor is an OLS sensor, the mapping and overlaying means including:

means for curvature correcting the OLS sensor data for a cross track direction; and means for curvature correcting the SSM/I sensor data for both a cross track and a long track direction.

26. A method according to claim 24, wherein said mapping means further includes:

means for resampling said first sensor's data using resampling tables to fit said first sensor's data into the second sensor's data image space.

27. An apparatus for displaying an OLS data image from an OLS sensor and at least one environmental data record (EDR) image obtained from an SSM/I sensor, for a particular geolocation, the apparatus comprising:

means for embedding at least one EDR image into the OLS data image for a particular geolocation to produce a single combined image; and means for displaying the single combined image.

28. An apparatus according to claim 27, wherein the embedding means comprises:

means for converting the EDR data image into a displayable EDR image;

means for thresholding the displayable EDR image to produce a converted image retaining only selected EDR data within the EDR data image;

means for shifting the converted EDR image into a lowest ordered pixel value range;

means for creating an EDR image mask from the shifted threshold image;

means for shifting and compressing the OLS data image into a range not occupied by the converted EDR image;

means for masking the scaled OLS data image with the EDR image mask to produce a masked OLS data image; and means for adding the threshold EDR image to the masked OLS data image to produce the single combined image.

* * * * *